Feb. 28, 1961     J. D. BOLESKY ET AL     2,973,419
THERMOSTATIC CONTROLS
Filed Feb. 24, 1959
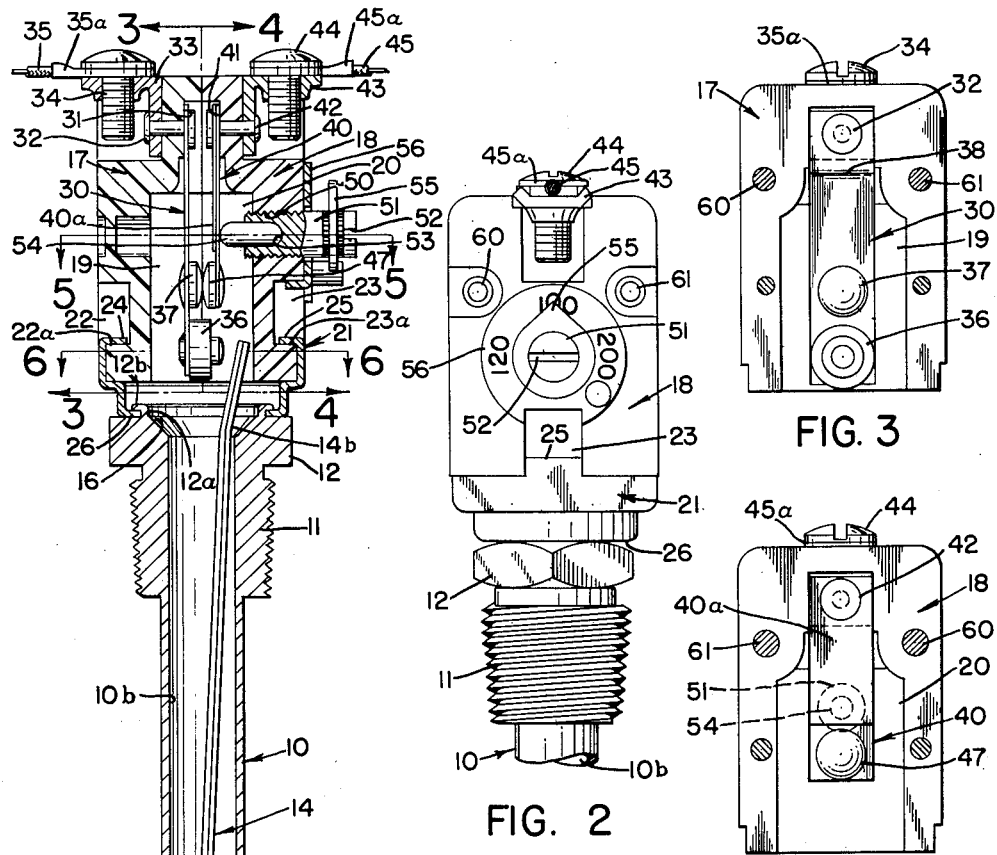
INVENTORS.
JOHN D. BOLESKY &
REXFORD M. MORRIS
BY
ATTORNEY United States Patent Office
2,973,419
Patented Feb. 28, 1961

2,973,419

THERMOSTATIC CONTROLS

John D. Bolesky and Rexford M. Morris, Mansfield, Ohio, assignors, by direct and mesne assignments, to Therm-O-Disc, Incorporated, Mansfield, Ohio, a corporation of Ohio Filed Feb. 24, 1959, Ser. No. 794,967

4 Claims. (Cl. 200—138)

This invention relates to a thermostat having a probe which is adapted to be immersed in a fluid whose temperature is to be regulated by the thermostat. It is particularly suitable for use in conjunction with hot water tanks and sterilizer units, but is not limited to these uses since it may be employed advantageously on other types of equipment.

One of the disadvantages of the probe-type thermostats proposed heretofore has been the tendency for the switch contacts to separate gradually, rather than abruptly, when the limiting temperature for which the thermostat has been set is reached. In large measure this has been due to the creep action of the temperature sensitive device in the thermostat which operates the switch therein. In many such previously proposed thermostats, this creep action has limited the temperature range over which the thermostat may operate.

This disadvantage is avoided in the thermostat of the present invention by the provision of a novel arrangement which insures a clean and abrupt opening of the switch when the critical temperature for which the thermostat has been set is reached.

Accordingly, it is an object of this invention to provide a novel and improved thermostat.

It is also an object of this invention to provide a novel thermostat having a probe which is adapted to be immersed in a fluid whose temperature is to be regulated.

It is a further object of this invention to provide a novel probe-type thermostat in which the switch is opened in an abrupt and clean manner when the pre-set temperature is reached.

A still further object of this invention is to provide a novel probe-type thermostat capable of operating with precision over a relatively wide temperature range.

Other objects and advantages of the present invention will become more apparent from the following detailed description of a presently-preferred embodiment thereof taken in conjunction with the accompanying drawings wherein corresponding reference characters denote corresponding parts and wherein:

Figure 1 is a sectional view taken lengthwise centrally through the thermostat of the present invention;

Figure 2 is a fragmentary elevational view of this thermostat, taken from the right end of Figure 1;

Figure 3 is a sectional view taken along the line 3—3 of Figure 1 and showing the movable contact arm of the switch in the thermostat;

Figure 4 is a section taken along the line 4—4 of Figure 1 and showing the stationary contact arm in the switch;

Figure 5 is a section taken along the line 5—5 of Figure 1;

Figure 6 is a section taken along the line 6—6 of Figure 1.

Referring first to Figure 1, the present thermostat has an elongated probe in the form of a tubular housing member 10 of brass, stainless steel or other suitable material having high heat conductivity. At its upper end in Figure 1 the probe housing 10 has an enlarged externally threaded mounting portion 11 which is joined to a collar 12 having a hexagonal external surface, as best seen in Figure 2 for accommodating a wrench when the thermostat is being mounted on the hot water tank, sterilizer or other device which it is to regulate. In the embodiment shown in the drawing the tubular probe housing 10 is shown as being integral with the mounting portion 11 and the hexagonal collar 12. However, if desired, the mounting portion 11 and collar 12 may be a member separate from the probe housing 10. As shown in Figure 1, the tubular probe housing 10 has a closed lower end 10a. This closed lower end of the tubular probe housing may be formed integral therewith, as indicated in Figure 1, or it may be in the form of a separate plug which is press fitted into the lower end of the tubular probe housing 10 and soldered in place there.

A plug 13 is secured in the closed lower end 10a of the probe housing. An elongated, generally flat bimetal strip 14 is anchored at its lower end in the plug 13 and extends lengthwise up through and beyond the probe housing. The plug 13 carries a reduced, upwardly projecting extension 15 to which the bimetal strip 14 is welded. In this manner, the plug provides a cantilever mounting for the bimetal strip. As shown in Figure 1, the bimetal strip 14 is generally flat, being formed with a bend at 14a, just slightly beyond the upper end of the plug extension 15. Because of this bend the bimetal strip normally extends at an acute angle to the axis of the probe housing. Upwardly from the plug extension 15 the probe housing 10 defines a cylindrical chamber 10b in which the bimetal strip 14 is loosely received so as to be capable of substantial movement laterally back and forth therein. At the upper end of the collar 12 on the probe housing, the probe housing chamber terminates in an outwardly and upwardly flared portion 16 which permits even greater movement of the bimetal strip. The bimetal strip is formed with a second bend at 14b which is disposed at this enlarged portion of the probe housing chamber. This second bend 14b is in the same direction as the first bend 14a, so that the upper free end of the bimetal strip extends at an even greater angle with respect to the axis of the probe housing.

The switch in the thermostat is contained in a housing composed of two substantially identical molded insulation housing members 17 and 18. These switch housing members abut against each other in face-to-face relationship and at their abutting inner faces present cavities or recesses 19 and 20 which together form a chamber in which the switch contacts are located, as explained in detail hereinafter.

The lower ends of the abutting switch housing members 17 and 18 are joined to the upper end of the probe housing by means of a metal cap 21. As shown in Figure 1, the switch housing members 17 and 18 are formed with external recesses 22 and 23 respectively, which presents upwardly facing shoulders 22a and 23a respectively. The metal cap 21 has lugs 24 and 25 which are turned over inwardly and engage these shoulders to secure the cap to the switch housing members. Below these turned over lugs, the metal cap snugly engages the periphery of the lower end of the housing members 17 and 18 and terminates at its lower end in a laterally inturned flange 26. This flange defines a generally circular opening which snugly receives a reduced diameter, upwardly projecting portion 12a on the probe housing. This portion 12a is turned over at 12b to snugly retain the probe housing engaged with the flange 26 on the metal cap 21. In this manner the probe housing is substantially rigidly joined to the switch housing members 17 and 18. The switch housing members are secured to each other by means of screws or other attachment members 60 and 61 which extend therethrough on either side of the cavities 19 and 20 therein, as shown in Figures 3 and 4.

A generally flat movable contact arm 30 is supported in cantilever fashion by the switch housing member 17. This contact arm is of suitable highly electrically conductive metal and is flexible and resilient transverse to its major faces. As shown in Figure 1, the housing member 17 presents a flat mounting surface 31 disposed above the recess 19 at its inner side. A rivet 32 holds the flat upper end of the movable contact arm 30 seated on this mounting surface 31. This rivet extends through the housing member 17 and is connected at the outer side threeof to a terminal 33 which receives a screw 34. The terminal 35a of an external lead-in wire 35 may be clamped in place between the screw 34 and switch terminal 33 in the usual manner. It will be apparent from Figure 1 that the switch contact arm 30 thus is mounted in cantilever fashion on the switch housing member 17, with the lower free end of this switch arm disposed in the chamber 19 formed at the inner face of the housing member 17.

At its lower extremity the switch contact arm 30 carries a bumper 36 of suitable insulation material which is positioned to be engaged by the upper end of the bimetal strip 14 when the later moves to the left in Figure 1. Spaced above its lower extremity the contact arm 30 carries a switch contact 37 which faces toward the recess 20 in the inner face of the opposite switch housing member 18. Just below its cantilever mounting the contact arm 30 is formed with a bend at 38 as shown in Figure 3, which tends to position the lower free end of this contact arm toward the opposite switch housing member 18. That is, the inherent bias which this bend imparts to the contact arm 30 tends to position its bumper 36 toward the upper free end of the bimetal strip 14.

The fixed contact arm 40 of the switch is mounted in a similar manner on the opposite switch housing member 18. As shown in Figure 1, the switch housing member 18 presents a flat mounting surface 41 disposed above the cavity 20 in this switch housing member. The upper end of the fixed contact arm 40 is mounted on this flat mounting surface by means of a rivet 42 which extends through the housing member 18 for connection to a terminal 43. The latter threadedly receives a screw 44 by means of which the terminal 45a of an external lead-in wire 45 may be clamped against the switch terminal 43.

As shown in Figures 1 and 4, the stationary contact carrying assembly includes an arm 40 in the form of a flat metal blade having a back-up spring member 40a to present front and back leaves which are in contiguous, face to face relationship. The back leaf of this contact carrying assembly extends below the lower end of the front leaf and carries a switch contact 47 disposed opposite the switch contact 37 on the movable contact-carrying arm 30 of the switch. The back-up spring member 40a stiffens the contact-carrying arm 40, and the disposition of the front leaf overlying the longer, contact-carrying back leaf tends to position these leaves straight down from the cantilever mounted upper end of this contact-carrying assembly. The significance of this construction will be apparent hereinafter.

As shown in Figure 1, the side wall of the switch housing member 18 is formed with a threaded opening 50 which threadedly receives a metallic adjustment screw 51 formed with a screw driver slot 52 at its outer end. The inner end of the adjustment screw is formed with a socket 53 which tightly receives and holds a rounded pin 54 of suitable insulation material. The inner end of this pin engages the back face of the contact-carrying arm 40. With this arrangement, by turning the adjusting screw 51, the position of the switch contact 47 carried by the contact-carrying arm 40 may be adjusted, as desired. A pointer 55 is secured to the adjustment screw 51 at the outside of the switch housing. This pointer turns in unison with the adjusting screw when the latter is turned.

The pointer overlies a temperature scale 56 which is mounted on the outside of the switch housing member 18, as shown in Figures 1 and 2.

The thermostat as shown is arranged to limit the maximum temperature to which the fluid, such as the water in a hot water tank, is heated. The switch contact 47 carried by the contact-carrying arm 40 is adjusted to a position dependent upon the temperature setting of the pointer 55. As shown, the higher the temperature setting, the farther inward the pin 54 will be moved, so that the switch contact 47 will be positioned farther to the left in Figure 1. The cantilever moutned bimetal strip 14 will sense the temperature of the fluid in which the probe 10 is disposed. As this temperature rises, the free end of the bimetal strip will move to the left. At the fluid temperature for which the pointer 55 is set, the free end of the bimetal strip will engage the insulation bumper 36 and force it and the movable contact-carrying arm 30 to the left, thereby separating the switch contact 37 from the switch contact 47 and breaking the circuit which is normally closed by the switch. The heat supply for the fluid will then be shut off in the usual manner.

Because of the bends at 14a and 14b in the bimetal strip 14 its upper free end has unopposed free movement prior to its engagement with the bumper 36. The engagement of the free end of the bimetal strip against the bumper 36 produces a relatively abrupt and clean separation of the mobile switch contact 37 from the fixed switch contact 47. Until being separated in this fashion, these contacts are maintained in snug engagement with each other, which engagement is enhanced by the bend at 38 in the contact-carrying arm 30 which biases the corresponding switch contact 37 against the opposite switch contact 47.

The contiguous back-up spring member 40a to the contact-carrying arm 40 makes this arm relatively stiff and maintains it snugly against the end of the pin 54 carried by the adjustment screw 51 at all times. Because of this, the adjustment screw positions the switch contact 47 in a precise and positive manner at all times. Such precise positioning of the switch contact 47 in turn determines in a precise manner the position of the bumper 36 for that temperature setting. It will be apparent from Figure 1 that, depending upon the temperature setting of the pointer 55, the bumper 36 may assume any corresponding position throughout a relatively wide arc of movement. Consequently, the present thermostat is capable of precise operation over a relatively wide range of temperatures.

While there has been described herein and illustrated in the accompanying drawing a preferred embodiment of the present invention, it is to be understood that various modifications, omissions and refinements which depart from the disclosed embodiment may be adopted without departing from the spirit and scope of this invention.

We claim:

1. A probe-type thermostat comprising an elongated probe housing which has an elongated chamber extending lengthwise therein and which is closed at one end, switch means at the opposite end of the probe housing, an elongated generally flat bimetal strip mounted in cantilever fashion at said closed end of the probe housing and loosely disposed in said probe housing chamber extending lengthwise therein, said bimetal strip terminating at its opposite end in a movable free portion, said switch means having a bumper positioned to be engaged by said movable free end portion of the bimetal strip to operate said switch means, said bimetal strip having a first bend therein beyond its cantilever mounted end and beyond said bend normally extending at an acute angle to the axis of the probe housing, and said bimetal strip toward its opposite end having a second bend in the same direction so that said movable free portion extends at an increased acute angle to the axis of the probe housing and away from engagement with said bumper, and means for laterally shifting the switch means relative to the movable free end portion of the bimetal element whereby the temperature at which the bimetal element is effective upon the switch means may be varied.

2. A thermostat comprising a switch assembly including a cantilever mounted contact-carrying arm in the form of a blade having a back-up spring member and presenting front and back leaves which extend in contiguous face-to-face relationship away from the mounting end thereof and which terminate in free ends remote from said cantilever mounted end, the free end of the back leaf of said contact-carrying arm extending beyond the free end of the front leaf, a switch contact mounted on the free end of said back leaf beyond the free end of the front leaf, an elongated probe housing, a bimetal member having one end mounted in said housing remote from the switch assembly and the other end freely movable in response to temperature changes for operating said switch means, and an adjustment member engageable with the back face of said back leaf to push said contact-carrying arm forward and thereby adjust the position of said switch contact, said front leaf bearing against the back leaf to maintain the latter in engagement with said adjustment member, whereby the switch assembly as a whole may be laterally shifted with respect to the free end of the bimetal member.

3. A thermostat comprising a switch housing having a chamber therein; a switch assembly mounted in said chamber and including an elongated movable contact-carrying arm which is cantilever mounted at one end in said switch housing and extends lengthwise in said chamber, said movable contact-carrying arm having an opposite free end which is movable, a bumper on said free end of the movable contact-carrying arm, a mobile switch contact on said movable contact-carrying arm between the latter's cantilever mounted end and said bumper, a fixed contact-carrying arm which is cantilever mounted at one end opposite said movable contact-carrying arm and which extends lengthwise in said chamber opposite said movable contact-carrying arm, said fixed contact-carrying arm having a contiguous back-up spring member which terminates short of said bumper on the movable contact-carrying arm, a fixed switch contact on said free end of the fixed contact arm opposite said mobile contact on said movable contact-carrying arm for engagement therewith; an elongated probe housing which extends lengthwise substantially in line with the contact-carrying arms of said switch assembly, said probe housing having an elongated chamber therein which opens into said chamber in the switch housing, the probe housing chamber extending away from said free ends of the contact-carrying arms in a direction substantially directly away from the cantilever mounted ends of the contact-carrying arms, said probe housing being closed at its end remote from the switch housing; and an elongated bimetal strip mounted in cantilever fashion at said closed end of the probe housing and extending lengthwise therein toward the chamber in the switch housing, said bimetal strip being loosely received in said probe housing chamber and being movable transversely therein, said bimetal strip terminating in a movable free end disposed in said chamber in the switch housing opposite said bumper at the side of the bumper where said fixed contact-carrying arm is located, and means for laterally shifting the switch assembly within said chamber relative to the movable free end of the bimetal strip to vary the temperature at which the bimetal strip is effective upon the switch assembly.

4. The thermostat of claim 3 wherein said bimetal strip is generally flat and has a first bend therein beyond its cantilever mounted end, said bimetal strip extending in the probe housing chamber from said first bend at an acute angle to the axis of the probe housing toward the side of the switch chamber at which the fixed contact-carrying arm is located, and said bimetal strip adjacent its free end having a second bend therein in the same direction as said first bend so that its free end extends at an increased acute angle away from said bumper.

References Cited in the file of this patent

UNITED STATES PATENTS

| | | |
|---|---|---|
| 1,803,203 | Nelson | Apr. 28, 1931 |
| 1,851,657 | Appelberg | Mar. 29, 1932 |
| 2,267,546 | Werner | Dec. 23, 1941 |
| 2,268,445 | Drapeau | Dec. 30, 1941 |
| 2,317,033 | Dafforn | Apr. 20, 1943 |
| 2,574,192 | Samuel | Nov. 6, 1951 |
| 2,750,475 | Clason | June 12, 1956 |